United States Patent
Blackmore et al.

(10) Patent No.: US 6,735,620 B1
(45) Date of Patent: May 11, 2004

(54) EFFICIENT PROTOCOL FOR RETRANSMIT LOGIC IN RELIABLE ZERO COPY MESSAGE TRANSPORT

(75) Inventors: Robert S. Blackmore, Poughkeepsie, NY (US); Rama K. Govindaraju, Poughkeepsie, NY (US); Gautam H. Shah, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 09/619,054

(22) Filed: Jul. 18, 2000

(51) Int. Cl.$^7$ .............................................. G06F 15/167
(52) U.S. Cl. ........................................ 709/212; 709/245
(58) Field of Search ................................ 709/212, 245, 709/227, 228, 250, 249

(56) References Cited

U.S. PATENT DOCUMENTS

| | | | |
|---|---|---|---|
| 4,910,733 A | 3/1990 | Sommani et al. .......... 370/85.1 |
| 4,995,056 A | 2/1991 | Fogg, Jr. et al. ................ 375/7 |
| 5,042,029 A | 8/1991 | Hayakawa .................... 370/60 |
| 5,063,562 A | 11/1991 | Barzilai et al. ............. 370/94.1 |
| 5,113,392 A | 5/1992 | Takiyasu et al. ......... 370/85.15 |
| 5,130,986 A | 7/1992 | Doshi et al. ............... 370/94.1 |
| 5,166,674 A | 11/1992 | Baum et al. ........... 340/825.07 |
| 5,193,151 A | 3/1993 | Jain .......................... 395/200 |
| 5,265,207 A | 11/1993 | Zak et al. ................... 395/200 |
| 5,313,582 A | 5/1994 | Hendel et al. ............... 395/250 |
| 5,335,232 A | 8/1994 | Suzuki et al. .............. 371/20.4 |
| 5,448,561 A | 9/1995 | Kaiser et al. ............... 370/85.1 |
| 5,463,382 A | 10/1995 | Nikas et al. ........... 340/825.44 |
| 5,490,168 A | 2/1996 | Phillips et al. ............... 375/224 |
| 5,539,465 A | 7/1996 | Xu et al. .................... 348/388 |
| 5,577,211 A | 11/1996 | Annapareddy et al. 395/200.13 |
| 5,745,487 A | 4/1998 | Hamaki ...................... 370/352 |
| 5,745,685 A | 4/1998 | Kirchner et al. ....... 395/200.14 |
| 5,784,649 A | 7/1998 | Begur et al. ................. 395/872 |
| 5,787,073 A | 7/1998 | Ikeda .......................... 370/236 |
| 5,812,775 A | 9/1998 | Van Seters et al. ..... 395/200.43 |
| 5,878,226 A | 3/1999 | Benner et al. ......... 395/200.63 |
| 5,923,662 A | 7/1999 | Stirling et al. .............. 370/432 |
| 5,931,925 A * | 8/1999 | McNabb et al. .............. 710/52 |
| 5,936,960 A | 8/1999 | Stewart ....................... 370/438 |
| 5,937,169 A * | 8/1999 | Connery et al. ............. 709/250 |
| 5,937,206 A * | 8/1999 | Nakamura ................... 710/22 |

(List continued on next page.)

Primary Examiner—Zarni Maung
(74) Attorney, Agent, or Firm—Lawrence D. Cutter

(57) ABSTRACT

In a transmission protocol in which a user running an application in an address space in one data processing system wishes to transmit a data packet to another address space in another data processing system by means of direct memory access directly from a sending buffer to a receiving buffer with no copy, a mechanism is provided for minimizing the need for retransmission and for insuring proper entry into the target data processing system address space. In particular, when the first system does not receive an acknowledgment from the receiver, a special data packet with a retransmit flag bit set is sent to the second system. When this system receives the data packet with the retransmit flag bit set the second system responds either by sending a new acknowledgment or by sending a request for retransmission. No transmission back to the first system occurs, however before such a request is made and in fact the receiving system does not send this retransmission request without insuring that its receipt would be appropriate. In particular, the second system, before requesting retransmission, checks to assure that tag association is still valid so that an adapter at the second system is still capable of matching tags in data packet headers with appropriate real address memory locations within address spaces belonging to the second receiving data processing system. In this manner needless retransmission of packets does not occur and retransmission occurs only when receipt of the data packet is appropriate.

1 Claim, 3 Drawing Sheets

U.S. PATENT DOCUMENTS

| | | | |
|---|---|---|---|
| 6,038,604 A | 3/2000 | Bender et al. | 709/233 |
| 6,038,606 A | 3/2000 | Brooks et al. | 709/235 |
| 6,044,079 A | 3/2000 | Calvignac et al. | 370/395 |
| 6,389,478 B1 * | 5/2002 | Blackmore et al. | 709/236 |
| 6,449,631 B1 * | 9/2002 | Takamoto et al. | 709/200 |
| 6,470,391 B2 * | 10/2002 | Takamoto et al. | 709/227 |
| 6,545,993 B1 * | 4/2003 | Bharath et al. | 370/337 |
| 6,631,415 B1 * | 10/2003 | James et al. | 709/227 |

* cited by examiner

| USER DATA | USER HEADER | SOFTWARE HEADER | HARDWARE HEADER |
|---|---|---|---|
| 410 | 420 | SEQUENCE NO.<br>HANDLE TYPE<br>SOURCE<br>DESTINATION<br>OFFSET<br>DATA LENGTH<br>430 | TAG<br>440 |

TRANSLATION TABLE — 245

| TAG | ADDRESS LIST |
|---|---|
| TAG | ADDRESS LIST |
| TAG | ADDRESS LIST |
| TAG | ADDRESS LIST |
| TAG | ADDRESS LIST |
| TAG | ADDRESS LIST |

FIG.4

EFFICIENT PROTOCOL FOR RETRANSMIT LOGIC IN RELIABLE ZERO COPY MESSAGE TRANSPORT

BACKGROUND OF THE INVENTION

The present invention is directed to an efficient method and system for transmitting messages from a user's address space on one system directly into a user's address space in a second system using direct memory access. In addition, the present invention is also directed to a data transmission protocol to eliminate unnecessary retransmission of data packets.

The present invention is employed in a number of different circumstances. It is employed in data processing systems which are remote from one another and which communicate by means of data packet transmission from a source system to a receiving system. Additionally, the present invention is employed in SANs (system area networks) systems which represent nodes or clusters of processors which are packaged as a single unit (frame/rack in a frame). The other application, running on a possibly different physical system, may belong to the same user or to a different user.

The present application is not, however, directed to the usual protocols for message transmission of data from one system to another. In particular, the present invention is specifically directed to protocols that utilize direct memory access (DMA) hardware and techniques for directly (zero copy) transferring information from the address space of a user's application running on one system directly to the address space of another or the same user running on a second system. With respect to direct memory access, it is a method which provides the most efficient mechanism for transferring messages and information into specific memory locations of another process. In particular, direct memory access avoids passage of data through central processing units. This is an exceedingly fast mode of operation and it is the most efficient. When the DMA access is used to go directly to a user buffer rather than a system buffer in a message passing system, it is referred to as a zero-copy protocol.

The zero-copy protocol requires that the receiving system must be fully prepared to receive the amount of data sent and must also have a mechanism for specifically identifying the exact location for data storage. Since the transmission contemplated in the present invention is directly into the memory locations of another processing system, it is important that the receiving system be sufficiently prepared to receive such transmission. It is important because the right amount of data must be supplied to exactly the correct memory locations. If this is not the case it is possible that data is either lost or corrupted and in fact, this could conceivable be data belonging to a different user than the one who is transmitting the message packets. Clearly, corruption or loss of data in this manner is an unacceptable operating condition.

Because data transmission is directed to specified real memory locations which are not statically associated with fixed virtual memory locations via DMA procedures, error conditions which arise be particularly difficult to handle. In particular, if the sender never receives an acknowledgment from the receiver that a particular data packet has been received, it is undesirable for the sender to resend the same packet. In particular, if the sender were to wait for a given period of time (elapsed "time out" amount) and were not to receive an acknowledgment from the receiver, a retransmission of this sort could resort in a wasted transmission and/or the insertion of incorrect data into inappropriate memory locations (or real memory which is not associated with the intended virtual memory target location). Accordingly, in accordance with the present invention the sender negotiates retransmission with the receiver. This avoids unnecessary transmission of data particularly in the event that the only error that has occurred is a loss of the acknowledgment on its return from the receiver to the sender. Such circumstances do not warrant the retransmission of another data packet but rather only require an indication that the data has indeed been received. Nonetheless, if there is a more significant problem than the mere loss of an acknowledgment returned to the sender, the sender must ensure that receiver has prepared the zero copy buffers for DMA access prior to retransmitting the packet.

In Clustered systems (SANs), the processing power of each node in the cluster (CPU speeds) is increasing very fast and so are the speeds of the interconnects linking the various nodes in the cluster. However, the memory bandwidth (a function of how fast the CPU can move data from one region of its memory to another) is not keeping pace with the CPU speeds and the interconnect speeds. As a result the cost of protocol processing in reliable messaging systems is being increasingly dominated (bottlenecked) by the copy cost in the protocol path. The copy cost also increases with the size of the message being transported. Increasingly in clustered systems, with the emergence of technologies like clustered file systems, the size of data that needs to be transported from one node to another has been consistently increasing, hence the need for zero copy protocols. In order to reliably transport data in a zero copy fashion, the acknowledgments are used to ensure guaranteed delivery. It is wasteful to have to retransmit large data packets if the acknowledgment were lost. Hence the motivation for this invention where we use a small control message to negotiate with the receiver to ensure that a retransmit of the zero copy transported packet is required. We limit ourselves to the design of an efficient retransmission mechanism for reliable zero copy transport mechanism.

TERMINOLOGY

Reliable Transport: A transport mechanism where the transport protocol guarantees that messages submitted to be sent will be received by the target transparently to the application recovering from transient network and network adapter failures. This is typically accomplished in the art by ensuring that every packet sent is acknowledged by the receiver and the sender retransmit the packet if an acknowledgment is not received in a well defined interval of time. The interval of time is a function of the efficiency parameters of the system (node, processor, network, etc.).

Zero Copy Transport: A mechanism for message passing where the DMA (direct memory access) engines (possibly on the network adapter connecting the node to the network) are programmed to directly move data from system (node) memory into the network on the sending side and from the network into system memory directly on the receiving side without the involvement of the CPU (central processing unit) on the node in the movement of data at either end. This mechanism frees up the CPA on the node from the data movement aspects of protocol processing. This is also sometimes loosely referred to as Direct Memory Access method.

The present application also hereby incorporates by reference the entire contents of application Ser. No. 09/619,053 filed concurrently herewith.

SUMMARY OF THE INVENTION

In accordance with a preferred embodiment of the present invention, a method for transmitting a data packet stored in a first data processing system directly into a list of address in a second data processing system comprises a plurality of steps starting with providing the data packet in the first processor (sender) with a header which includes a tag which is associatable with a real address (possibly a list of real addresses) within the second processor (receiver). This data packet is transmitted with a header to the network adapter which is coupled to the receiver via an adapter which is coupled at the sender. This network adapter is provided with the mapping between the tag in the header with a real address (or possibly a list of real addresses) within the memory of the receiving system. Data in this data packet is transferred from the adapters to real address locations in the memory of the second system via direct memory access (DMA) (i.e. by programming the DMA engines typically on the network adapter to effect the movement of data). An acknowledgment is then transmitted back to the sender indicating that successful receipt of the data packet has occurred. If the first process (or system the sender) does not detect that an acknowledgment has been received, it transmits to the receiving process (or system) a data packet which includes a retransmit flag bit which is set so as to indicate the sender's willingness to resend the data packet. Upon receipt of the data packet with the retransmit flag bit set, the second process (or system) does one of two things. If the second system detects that the data had already been received and had already sent an acknowledgment, then it is only necessary that the second system resend a data packet with a header indicating acknowledgment of the original receipt (this is the case when the original acknowledgment packet was lost in the network). Otherwise the receiving system never received the zero copy packet. At this time and only at this time would the second process (or system) transmit to the sending first process a request for retransmission. And most importantly, this request for retransmission would not be sent by the second process until it has established that tag association in the adapter can still take place with respect to the data packet which is anticipated to be received a second time from the sending process. Thus in accordance with the present invention a lost acknowledgment from the second process does not necessarily result in the retransmission of the same data. Furthermore, retransmission of data occurs now only at a time when DMA transfer is possible. This insures that most of the bandwidth between processors is used only for necessary communications. It further assures that the retransmission of the data packet is going to be successful and in particular, it assures that data will be written into the correct address space and into the correct memory locations within that address space.

Accordingly, it is an object of the present invention to provide a method for transmitting data directly from an address space of one process into the address space of another process via direct memory access (zero copy).

It is a further object of the present invention to ensure extremely rapid data transfer rates between systems.

It is also an object of the present invention to ensure that any and all direct memory access occurring from a different system occurs correctly without corrupting data.

It is a still further object of the present invention to ensure address space integrity in a receiving data processing system.

It is also an object of the present invention to minimize retransmission of data packet requests. The same zero copy data packets are never received twice by the receiver.

It is yet another object of the present invention to take full advantage of direct memory access procedures and techniques typically available on the network adapters.

It is also an object of the present invention to ensure that data is not transmitted from one system to another without the second system being fully prepared for its receipt and in particular fully prepared for DMA operations to user's buffers.

It is a still further object of the present invention to most efficiently handle the problems associated with lost acknowledgment transmissions.

It is a still further object of the present invention to enable users running applications in their own address spaces on one data processing system to be able to transfer data accurately and efficiently into a user's address space in another data processing system whether or not that data processing system is remote or in fact contained within the same physical package or frame.

It is also an object of the present invention to facilitate the protocol that it known as reliable zero copy transport.

It is yet another object of the present invention to ensure that memory locations where data is to be received in a receiving process are fully available for the intended data transfer when retransmission of data is undertaken.

Lastly, but not limited hereto, it is an object of the present invention to establish a data communication protocol that takes full advantage of direct memory access capabilities.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 3 is a diagram illustrating the logical structure of a data packet which is preferably transmitted in accordance with the present invention;

FIG. 4 is a table illustrating the contents and structure of a translation table contained within an adapter coupled to the receiving processor.

DETAILED DESCRIPTION OF THE INVENTION

Figure 1:
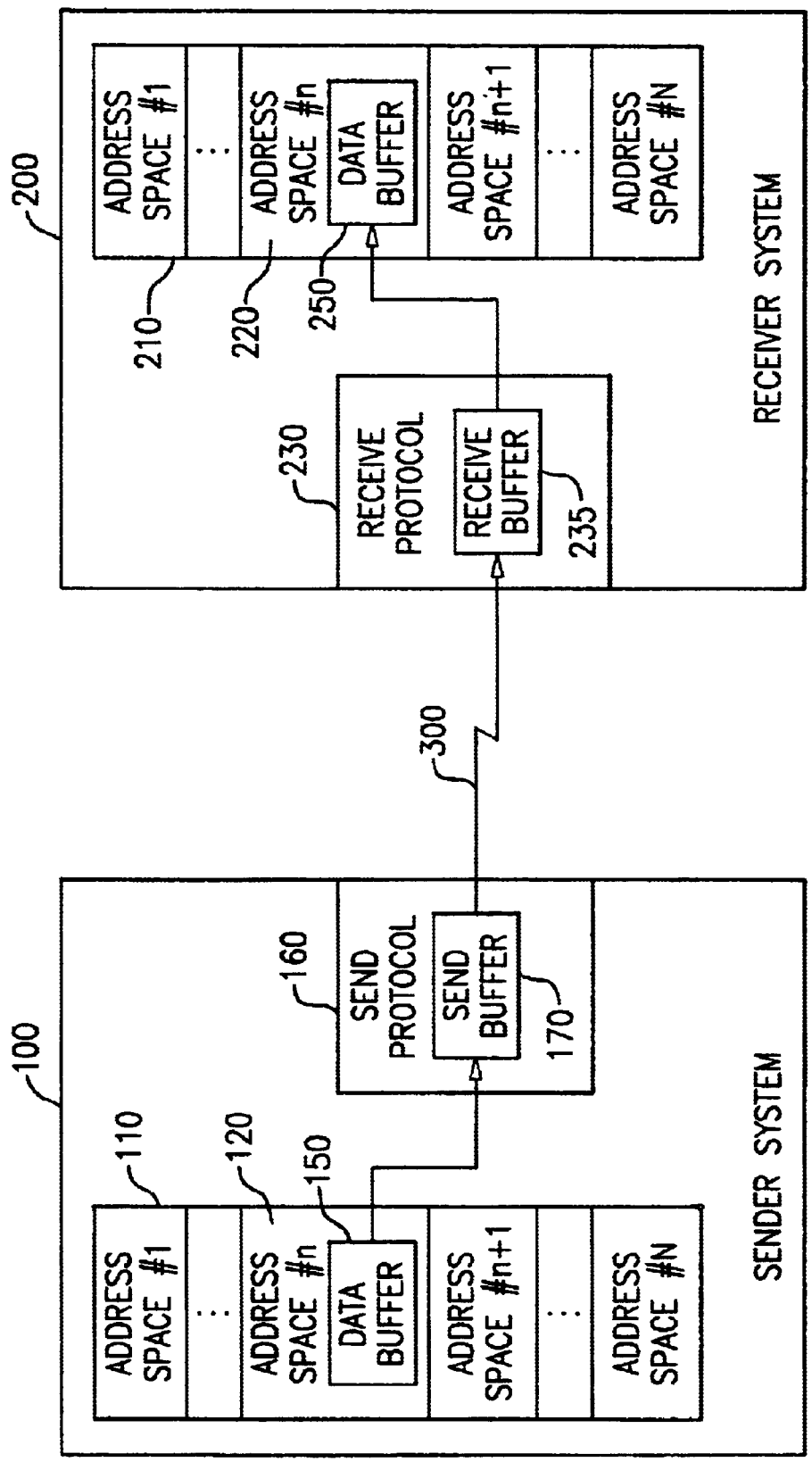
FIG. 1 is a block diagram illustrating a non-zero-copy transmission protocol.

FIG. 1 illustrates one system and method for transmitting messages from one data processing system 100 to another data processing 200. In the context of the present invention data processing systems 100 and 200 may comprise units as small as microprocessors. The term data processing system may also comprise a collection of data processing nodes or in an even larger context the term also refers to computer complexes in remote locations.

Both the server/sender data processing system 100 and the client/receiver data processing system 200 include memory systems in which different users are assigned to different address spaces. For example, in server/sender system 100 memory unit 110 typically includes main addressable storage and disc storage. Thus in such systems references made to memory by an application are typically assigned to an address space. At any one time memory system 110 is divided into a plurality N of individual address spaces. Some of these address spaces may in fact be "owned by" the same user. Some of these address spaces may in fact include only data and some of these address spaces may in fact include both data and executable programming code.

The present invention is particularly directed to the problems of transmitting information messages from one data processing system 100 to another such system 200. In particular the invention is directed to those situations in which one or more users cooperatively or individually interact to pass such messages to an application running in a different address space to 220 in client/receiver system 200. For this purpose an application program running in address space 120 includes data buffer 150 which stores the message to be transmitted. In an approach which is different from that undertaken in the present invention system, system message transfer is accomplished by first transferring the desired message data stored in data buffer 150 to a send buffer which is under the control of send protocol 160 in sender/server system 100. This protocol programming causes the information in send buffer 170 to be transferred to a receive buffer 235 which operates under the control of receive protocol program 230 contained within client/receiver system 200. This transmission occurs over any convenient interconnect 300 which could include fiber optic cable, coaxial cable, hard wires, or even, in certain circumstances via wireless links. Receive protocol 230 receives the message via link 300 and stores this message in receive buffer 235. Receive protocol programming 230 then decides which address space in system 200 should receive the contents of receive buffer 235. In particular, in the instance shown, the message is transferred to corresponding data buffer 250 within address space 220 which lies in memory addressing structure 210 of system 200.

There are several problems associated with the system and process illustrated in FIG. 1. In particular, it is seen that the message to be transmitted must first be passed from data buffer 150 to send buffer 170 and thus via link 300 to receive buffer 235 and then ultimately over a relatively long due course of time to data buffer 250. This involves a number of copies of the data being staged in its passage from system 100 to system 200. Thus, data is unnecessarily duplicated, the CPU is unnecessarily engaged in moving data, and more importantly, the message data is not directly inserted into the desired address space as quickly as possible.

In contrast, direct memory access (zero copy) techniques are known which supply data directly from external I/O devices to computer systems in a very fast and direct manner. In general, direct memory access refers to those techniques employed in computer systems in which certain clock cycles on the system bus are used by the memory system. This is generally known by those skilled in the art as the phrase "cycle stealing." Direct memory access is therefore fast particularly since it avoids the need to use CPU cycles to perform the transfer. However, since information is being written directly into real address memory locations great care must be undertaken to ensure that the correct data is written into the correct locations at the correct time. Accordingly, the systems shown in FIG. 1 is not as fast as possible since it does not take advantage of direct memory access techniques.

However, through the utilization of adapter 240, DMA transfer is employed. However, utilization of such techniques requires modifications to the messaging protocol to ensure that the data in the memory unit 210 of system 200 is not corrupted or inaccurate. In particular, adapter 240 is preferably provided in the form of adapters TB3MX, TB3MCA and TB3PCI as supplied by the IBM Corporation which is the assignee of the present invention. Adapter 240 includes translation table 245 (See also FIG. 4). This table maps a tag in data packet 400 to a list of real address in address unit 210. These real addresses are supplied to DMA unit 230 in system 200 which writes this message directly into receive buffer 250 which is part of destination address space 220.

Figure 2:
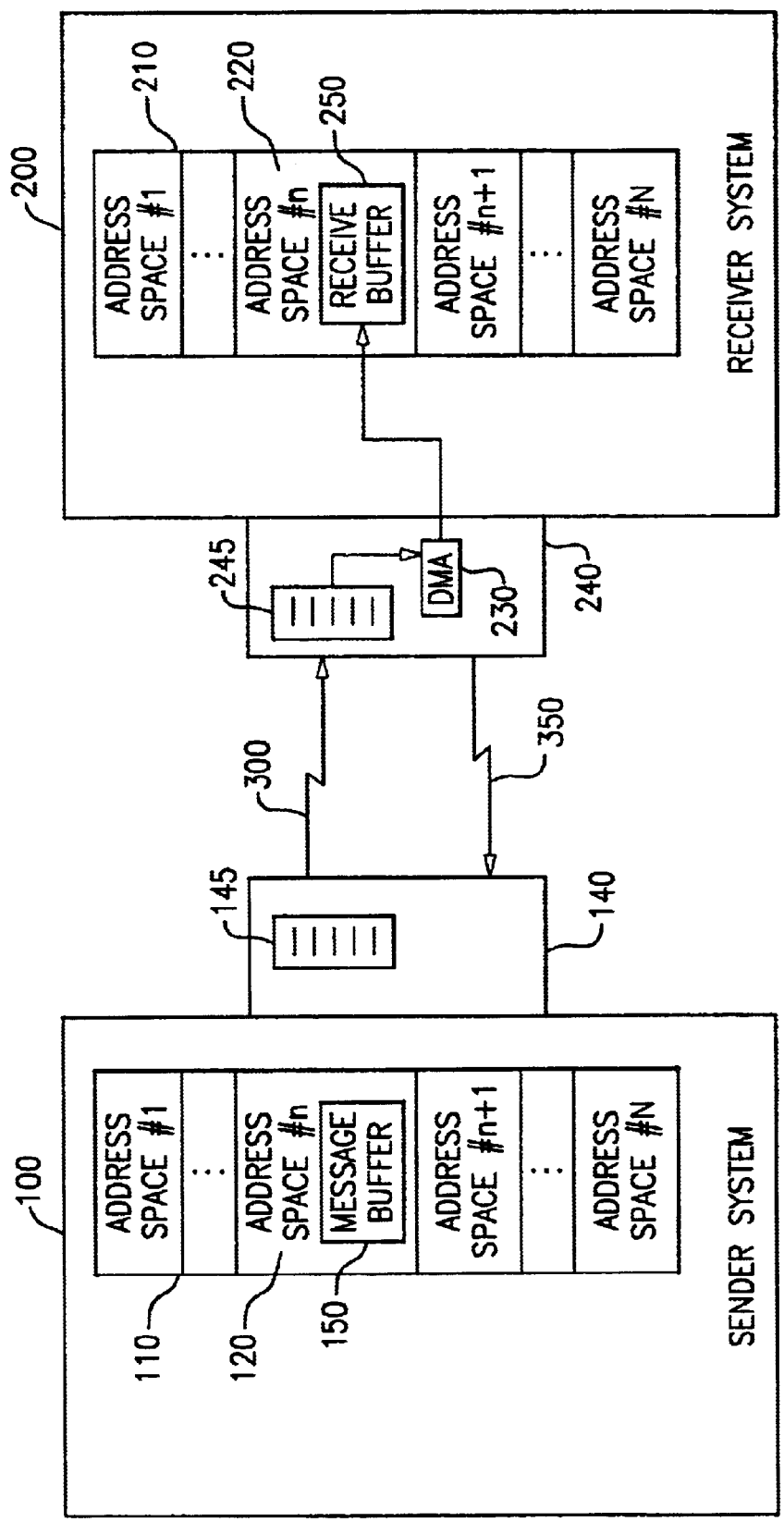
FIG. 2 is a block diagram illustrating systems incorporating the transmission protocol of the present invention.

However, the use of DMA unit 230 alone does not solve all of the problems created in such a transfer mechanism. In particular, in message transmission protocols of the kind contemplated herein it is generally required that the message source be notified of the proper receipt of the message packet sent to drive retransmission if necessary, for reliability. For example, this occurs through link 350 which may or may not be the same as link 300, as shown in FIG. 2. This acknowledgment of the receipt of the message data is a required part of a continued operation of applications running with the confidence that the data has been correctly transmitted to a receiving processor.

However, two forms of error are typically possible in such circumstances. It is first of all possible that the data was never properly received at the destination. It is also possible that the acknowledgment of the receipt of this data was merely lost. These two forms of error present different modalities for solution.

In particular, in accordance with the present invention, if first processor 100 does not receive an acknowledgment, a second data packet is transmitted to receiving processor 200 with a retransmit flag bit which is set. When this data packet, with the retransmit flag bit set, is received by the second receiving process, one of two actions is carried out. In the event that it was only the acknowledgment that was lost a new acknowledgment is sent. This provides an efficient solution for this problem. In particular, by sending a new acknowledgment, entry into a new data transmission protocol is eliminated.

However, in the event that the original data was not properly received by processing system 200, a request for retransmission is sent to sending system 100. However, this request for retransmission is only sent subsequent to verification that the association mapping tags in table 245 to real addresses in address space 220 is still correct. This prevents corruption of data that could otherwise occur upon retransmission. Accordingly, a significant aspect of the present invention is that data is not retransmitted without some form of negotiation with the target system. In all cases the "zero copy packet" is accompanied by a header. In the case where the sending side does not receive an acknowledgment, rather than resending the entire packet, only the header is sent containing a retransmit flag. Accordingly, data is retransmitted only after an explicit indication from the target that the user buffer is still available for zero copy transmission. Furthermore, the present invention also includes part of the message ID and packet number in the tag so that previously unmatched zero packets delayed in the network do not erroneously match posted buffers when they arrive later. Accordingly, in the present invention only prepared buffers receive DMA packets. This leads to robustness since it is never possible for stray data to be accidentally put into a previously used real address location. While this protocol involves a rendezvous message, it is more efficient since in those cases in which the acknowledgment has been lost, only a small header rather than the entire data packet need to be sent. This has the advantage that the normal transmission path is optimized at the cost of a somewhat higher time involvement in the much rarer case of recovery by retransmission of a lost packet.

For purposes of practicing the invention a complete data packet for transmission has a structure which is preferably the same as or similar to the one that is shown in FIG. 3. In particular, packet 400 includes Hardware Header 440, Software Header 430, User Header 420 and User Data 410. User Data 410 and User Header 420 are fields that are under control of the user. Hardware Header 440 includes the tag which is matched to a real address in translation table 245 as seen in FIG. 4. Additionally, Software Header 430 includes such information as sequence number, handler type (which indicates how the message data should be treated, i.e. as part of a put, get or active message memory operation), source, destination, offset and data length. This header information "Hardware Header 440 and Software Header 430" contains enough information for the target side to identify real addresses to enable the hardware to insert the information in desired receive buffer 250 via DMA operations.

Accordingly, from the above, it is seen that the present invention provides a method and system for the efficient use of DMA technology. In particular, it is seen that the present invention provides a system and method for the rapid and accurate transmission of message data from an application program running in one data processing system directly into the address space of an application running in a target data processing system. The applications running in the corresponding address spaces in these two systems may belong to the same user or may belong to different users. Nonetheless, in any event, in the rare event that an error in transmission occurs, that error is corrected in an efficient manner which protects data integrity particularly in the target system. Furthermore, it does this in an efficient manner for which retransmission is required only in rare and well defined circumstances.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for transmitting a data packet stored in a first data processing system directly into an address space in a second data processing system, said method comprising the steps of:

providing said data packet in said first system with a header which includes a tag which is associatable with a list of real address (one for each physical page) within said second system;

transmitting said data packet with header to an adapter which is coupled to said second system and which is provided for associating said tag in said header with a real address within an addressable memory in said second system;

transferring data, in said data packet from said adapter, to real address locations in said addressable memory via direct memory access;

transmitting an acknowledgment from said second system to said first processor indicating successful receipt of said data packet;

upon the condition that said first system does not receive said acknowledgment, transmitting to said second system from said first processor a data packet with a retransmit flag bit set; and upon receipt by said second system of said data packet with said retransmit flag bit set, replying to said first processor either by sending a new acknowledgment, or by, subsequent to tag association verification, sending a request for retransmission.

* * * * *